May 23, 1950  R. W. HAGIE ET AL  2,508,605
CORN DETASSELING MACHINE
Filed Nov. 24, 1947  3 Sheets-Sheet 1
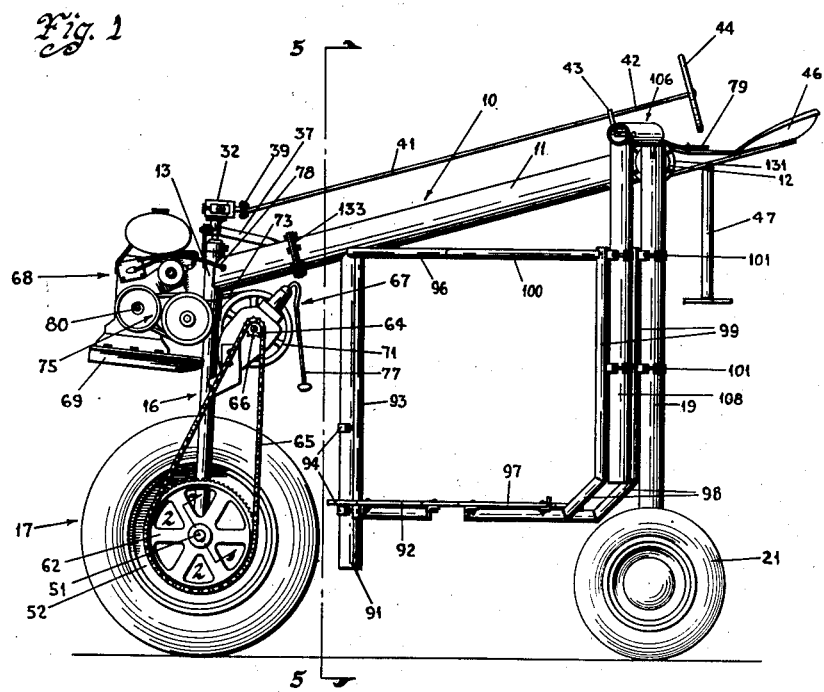
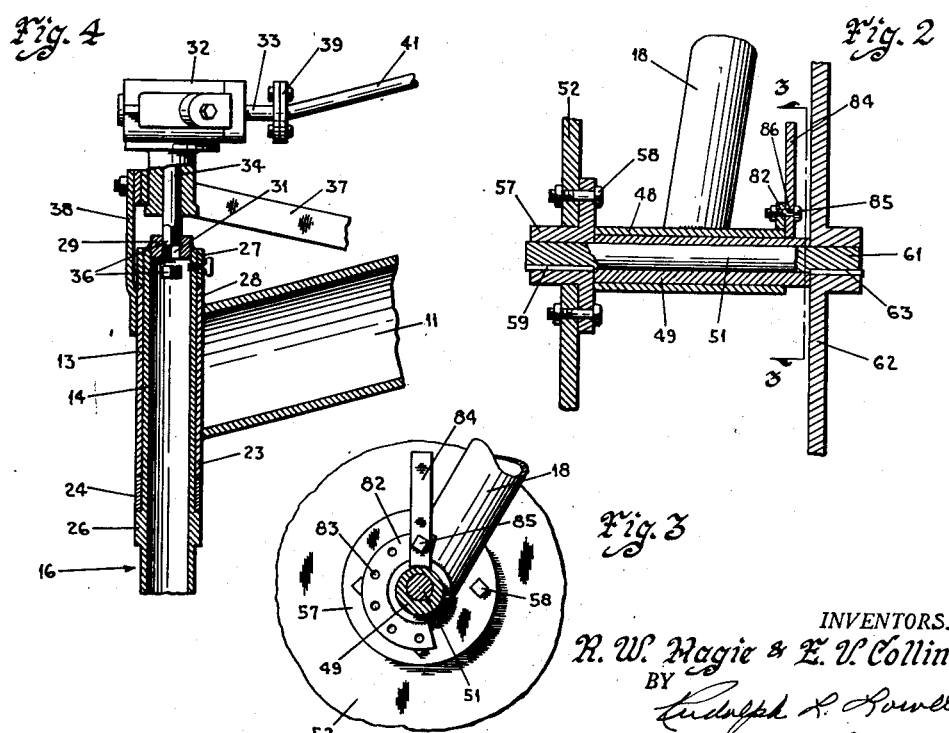
INVENTORS.
R. W. Hagie & E. V. Collins
BY
Rudolph L. Lowell
Attorney May 23, 1950 R. W. HAGIE ET AL 2,508,605
CORN DETASSELING MACHINE
Filed Nov. 24, 1947 3 Sheets-Sheet 2
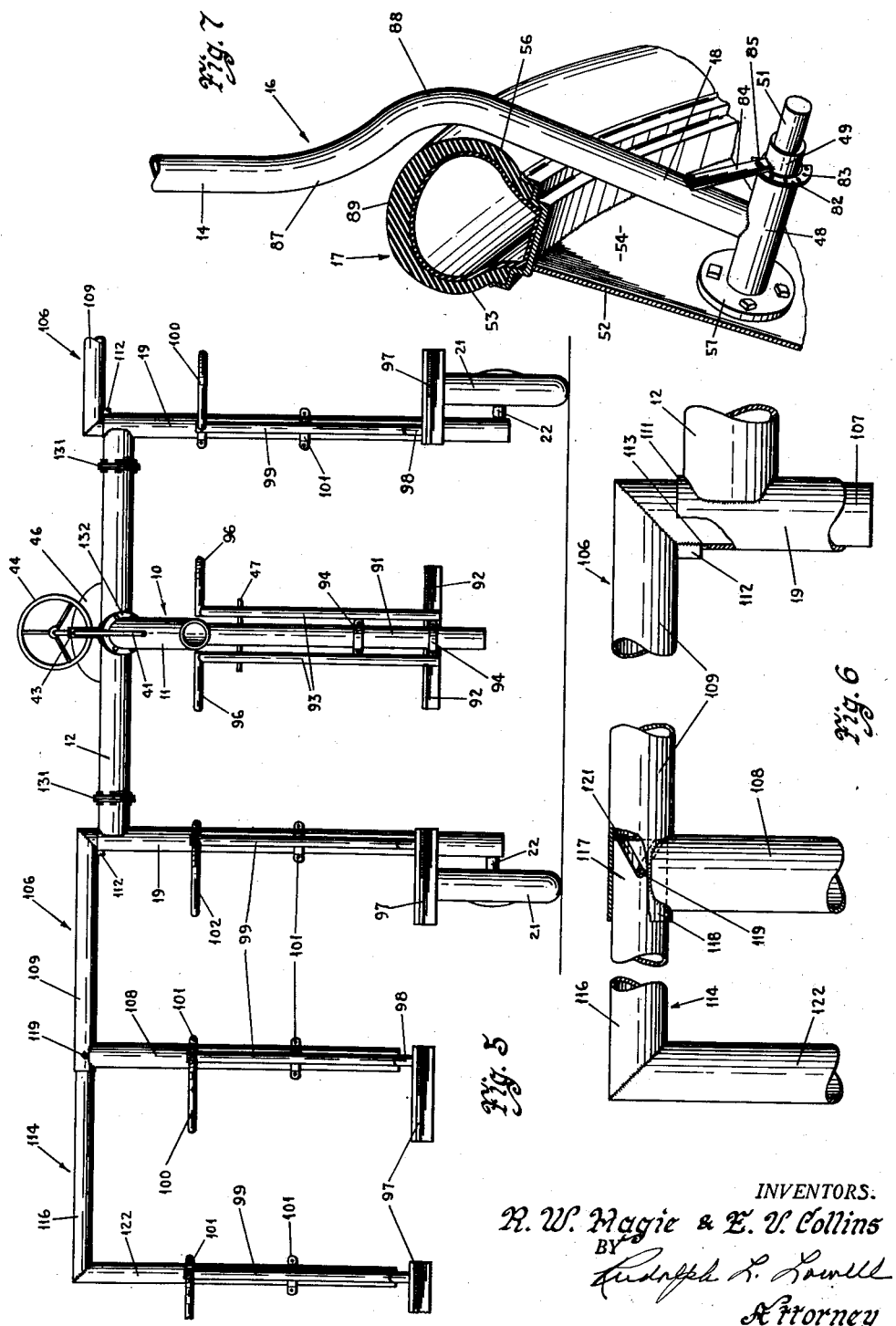
INVENTORS.
R. W. Hagie & E. V. Collins
BY
Rudolph L. Lowell
Attorney

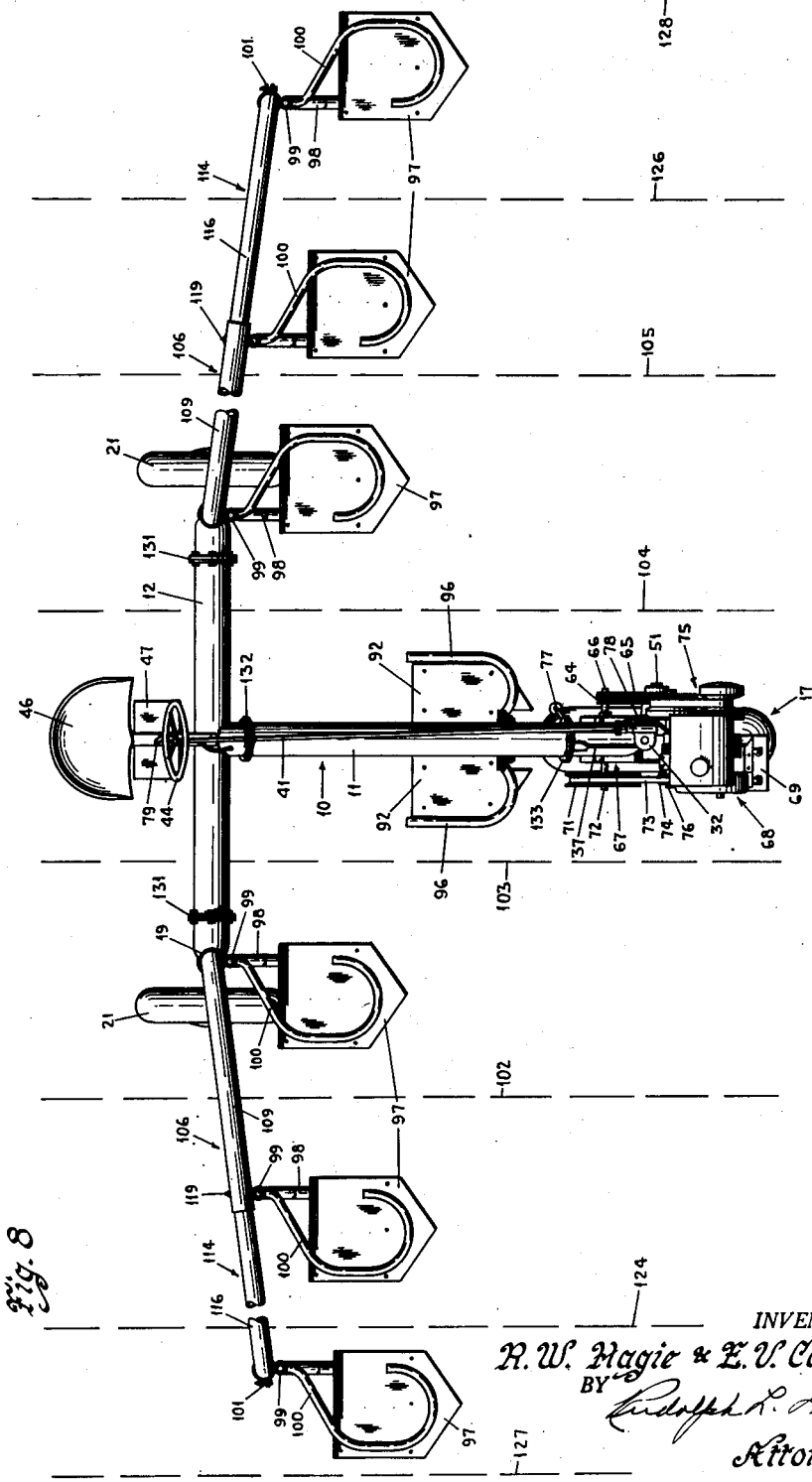

Patented May 23, 1950

2,508,605

UNITED STATES PATENT OFFICE 2,508,605

CORN DETASSELING MACHINE

Raymond W. Hagie, Clarion, and Edgar V. Collins, Ames, Iowa

Application November 24, 1947, Serial No. 787,768

5 Claims. (Cl. 180—26)

This invention relates generally to corn working machines and in particular to a machine for carrying corn detasselers through a corn field to provide for a manual removal of the corn tassels.

The machine of this invention is adapted primarily for use in the growing of hybrid corn. As is well known, hybrid corn is the result of crossing two grades or types of selected corn. One of such grades is usually referred to as the male corn and the other as the female corn. In planting a field of hybrid corn, the usual practice is to plant two male rows, then six female rows, followed again by two male rows and six female rows over the entire field. When the corn reaches the tassel stage, the tassels are picked only from the female rows. As a result, pollenization of the silks on the ears of corn in the female rows can only take place with the pollen from the tassels in the male rows of corn. The resultant hybrid corn, therefore, is produced only in the female rows, since the pollen from the tassels in the male rows, dropping on the silks of the ears of corn in the male rows, will merely reproduce the male corn.

Detasseling of the corn in the female rows is generally repeated several times during a single season, since tassels continue to grow until the corn is almost ready to harvest. This detasseling of the female corn is a manual operation. Prior to the use of machines detasseling was accomplished by having persons bend the stalks of female corn over to reach the tassels. However, it is now a rather common practice to provide machines, referred to as corn detasseling machines, capable of carrying six or more persons through adjacent rows of female corn at a relatively slow rate of speed, so the female corn can be detasseled as the machine is advanced.

Corn detasseling machines now in use are generally satisfactory but are objectionable in that they lack adequate maneuverability in the field, in the farmyard and on the highway. Detasseling must often be done under wet weather conditions and these machines usually become bogged down or stuck in the mud so that corn detasseling must be suspended during wet field conditions. As a result the yield of hybrid corn may be appreciably reduced.

A further objection is found in the fact that these corn detasseling machines are generally bulky so as to require a large turning radius at the end of the corn rows. As a result a considerable amount of corn is knocked down and lost to the harvest.

Yet another objection is found in the fact that lack of adjustments in the construction of the machine frame providing for the overall width of the machine being reduced, appreciably limits the transportation of the machine from field to field, and the adaptation of the machine to detassel a various number of corn rows.

It is an object of this invention, therefore, to provide an improved corn detasseling machine.

A further object of this invention is to provide a corn detasseling machine capable of traversing corn fields under substantially all kinds of weather conditions.

Yet another object of this invention is to provide a corn detasseling machine of a construction such that it is readily adapted to the detasseling of either four, six or eight rows of corn, and adjustable in width to permit its ready travel along the highway and through usual farm gates.

Still another object of this invention is to provide a corn detasseling machine of a simple and compact construction which is easily manipulated through corn fields without destruction to the corn, maneuverable in either a forward or a backward direction, and adapted to be turned around within a minimum of space.

Yet a further object of this invention is to provide a machine for working in fields of substantially full grown corn, without in any way injuring the corn, for the purpose of spraying or fertilizing the corn, or for carrying persons to detassel the corn.

A feature of this invention is found in the provision of a corn working machine having a portable frame of a T-shape supported at its three free ends on legs so as to be at an elevation substantially adjacent the upper ends of corn in a tassel stage. The leg at the free end of the stem member of the T-frame is rotatable and carries a relatively large combination traction and steering wheel. Rear ground wheels are mounted at the lower ends of the cross member legs, with all of the legs being relatively arranged transversely of the machine so as to travel between the rows of corn being worked on.

Another feature of this invention is found in the provision of a corn detasseling machine having a portable frame of a T-shape, in which the cross member of the frame is provided with detachable extensions to adapt the machine for the detasseling of four, six or eight rows of corn.

Further objects, features and advantages of this invention will become apparent from the following description when taken in connection with the accompanying drawings, in which:

Fig. 1 is a side elevational view of the corn detasseling machine of this invention;

Fig. 2 is an enlarged sectional detail view taken along the line 2—2 in Fig. 1, showing the front wheel assembly;

Fig. 3 is a transverse sectional view as seen on the lines 3—3 in Fig. 2;

Fig. 4 is an enlarged fragmentary vertical sectional view showing the steering post assembly at the front end of the machine;

Fig. 5 is a foreshortened transverse sectional view of the machine as taken on the line 5—5 in Fig. 1;

Fig. 6 is an enlarged foreshortened detail view, partly in section, showing the assembly of a detachable platform support with the main frame of the machine;

Fig. 7 is a fragmentary perspective view of the front wheel and the steering post therefor; and Fig. 8 is a foreshortened plan view of the detasseling machine.

With reference to the drawings, the detasseling machine of this invention is illustrated in Figs. 1, 5 and 8 as including a portable frame 10 of a T-shape having a single longitudinally extended backbone or stem member 11 and a transverse rear frame or cross member 12, both of which are of a tubular construction.

Secured to the front end of the backbone member 11 is an upright sleeve or bearing member 13 (Figs. 4 and 7) for rotatably supporting the top straight section 14 of a downwardly extended steering post 16 having a front wheel 17 carried on its lower end portion 18. A pair of downwardly projected tubular legs 19 (Figs. 1 and 5) are secured at their upper ends to the opposite ends of the rear cross member 12. Rear ground wheels 21 are rotatably supported on shafts 22 extended laterally outwardly from the lower ends of the legs 19.

It is seen, therefore, that the T-frame 10 is supported on the rear legs 19 and on the steering post 16, which constitutes a rotatable front leg. As best appears in Fig. 1, the backbone member 11 is inclined forwardly and downwardly from the rear cross member 12. It is contemplated that the rear legs 19 be of a height to provide for the cross member 12 being at a position substantially at the level of the upper ends of corn, which is in a tassel stage.

The steering post 16 is of a tubular construction and of a somewhat irregular shape, as shown in Fig. 7, for a purpose to appear later. As was previously explained, the top straight section 14 of the steering post 16 is rotatably supported within the sleeve 13 at the front end of the backbone member 11. The lower end 23 of the sleeve 13 (Fig. 4) rides on the top side of a collar 24 which is freely rotatable about the steering post 16. The collar 24, in turn, rests on the top side of a ring 26 positioned about and fixed to the steering post 16. A lock ring 27, mounted about the steering post section 14, for contact engagement with the upper end 28 of the sleeve 13, cooperates with the fixed ring 26 to hold the sleeve 13 against up and down movement relative to the steering post 16. Positioned within the open upper end of the steering post top section 14 is a socket member 29 which is secured, as by welding, to the steering post and formed with a centrally located opening 31 of a square shape.

A gear casing 32, for a worm and gear assembly (not shown), is equipped with an input shaft 33 (Figs. 1 and 4) and an output shaft 34 arranged at right angles to each other. The casing 32 is arranged so that the shaft 34 extends downwardly and the shaft 33 rearwardly therefrom. The lower end of the shaft 34 is formed with a square section 36 adapted to be received within the square opening 31 formed in the socket member 29. The casing 32 is maintained in a fixed assembly relation with the frame 10 by the provision of brace members 37 and 38 connected between the casing 32 and the backbone member 11 and sleeve 13, respectively. The shaft 33 is connected at 39 with the front end of a steering rod 41 which extends rearwardly in a spaced relation above the backbone member 11 and has its rear end 42 rotatably supported in a bracket 43 carried on the member 11. A steering wheel 44 is mounted on the steering rod 42 at a position rearwardly of the cross member 12 and a seat 46, for the machine operator, is carried to the rear of the cross member 12 at a position providing for a convenient manipulation by the operator of the steering wheel 44. A foot rest 47 for the operator is supported from the seat 46.

Secured to the bottom end section 18 of the steering post 16, as by welding, is a journal sleeve member 48 (Figs. 2 and 7) which rotatably carries an eccentric bearing 49 for a front wheel shaft 51. The wheel 17 is of a disc type and has the disc 52 thereof transversely offset so as to be closely adjacent to the wheel side 53. As a result, a cavity or opening indicated at 54, is formed in the wheel side 56. A hub 57 for the wheel 17 is secured to the disc 52 by bolts 58. The shaft 51 has one of its ends positioned within and keyed to the hub 57 at 59, while its opposite end 61 projects outwardly from the wheel side 56. The journal sleeve 48 and bearing 49 are positioned between the hub 57 and a sprocket 62 which is keyed at 63 on the shaft end 61.

The sprocket 62 (Figs. 1 and 8) is connected through a chain 65 with a sprocket 64 mounted on the power takeoff shaft 66 of a power transmission device 67, which is mounted on the top section 14 of the steering post 16, at a position below the backbone 11 of the frame 10. A power unit 68, illustrated as being an air cooled engine, is mounted on a base 69 which is suitably secured to the front side of the top section 14 of the steering post and projects forwardly from the post. A pulley 71 for an input or driven shaft 72 of the transmission device 67, is connected through a belt 73 with a pulley 74 carried on a shaft 76 forming part of an automatic clutch and variable speed unit 75, which is operatively connected with the engine shaft 80.

It is thus seen that the power unit 68 and the transmission device 67 are arranged at opposite sides of the steering post 16. A usual shift lever 77, for changing the speed and rotational direction of the power takeoff shaft 66, is formed as a part of the transmission device. A control wire 78 for the engine throttle (not shown) is positioned within the backbone 11 and has a rear actuated portion 79 arranged forwardly of the operator's seat 46. By virtue of the variable speed and clutch system 75, a full control of the machine is accomplished through a manipulation of the throttle wire 78. A desired adjustment of the tension in the sprocket chain 65 is accomplished by the provision of means including a quadrant 82 mounted about the outer end of the journal sleeve 48 and formed with a series of spaced holes 83 (Figs. 2 and 3). An adjustment lever 84 is secured at the outer end of the eccentric bearing 49 such that an opening 86 therein is movable to an aligned position with one of the quadrant openings 83. On adjustment of the lever 84, the sprocket 62 is moved toward and away from the sprocket 64 of the transmission device 67. A moved position of the lever 84 is maintained by the insertion of a bolt 85 through the lever opening 86 and one of the quadrant openings 83.

The front wheel 17 is of a relatively large size, and in one embodiment of the invention is of a twenty-four inch diameter rim with a ten inch tire. A wheel and tire of these dimensions has been found to provide a positive tractive effort with the ground under substantially all weather conditions. However, with a large front wheel 17, it is necessary that the assembly of the wheel with its drive sprocket 62, which will hereinafter be referred to as the front wheel assembly, be of a relatively short length transversely of the machine to provide a suitable clearance relation with adjacent rows of corn so as to permit some latitude or variation in the steering of the machine between the corn rows without injuring any of the corn.

Such a compact arrangement of the front wheel assembly is accomplished by means including the offset disc 52 and the irregular shaped steering post 16 (Fig. 7). The journal sleeve 48 and eccentric bearing 49 are positioned substantially within the wheel cavity 54 and the shaft end 61 is of a length so as to be positioned closely adjacent to the wheel side 56.

The steering post 16 (Fig. 7) is formed with two reversely curved portions 87 and 88, over its intermediate section, with such curved portions being in the same plane and relatively arranged so that the bottom straight section 18 of the steering post is substantially within the wheel cavity 54, the lower curved portion 88 is extended about the front wheel tire 89 at the wheel side 56 at a position between the upright lengths of the sprocket chain 65, the upper curved portion 87 is extended about the top side of the tire 89, and the top straight section 14 is in an upright position substantially intermediate the transverse confines of the front wheel. The front wheel assembly is thus of a relatively small overall length, and the steering post 16, which constitutes the only support for the front end of the frame 10, is substantially within the confines of such assembly.

Secured to the front end of the frame backbone member 11 at a position to the rear of the steering post 16, is a downwardly projected front platform support 91 of a tubular construction (Figs. 1 and 5). A pair of oppositely arranged horizontal platforms 92, on which the tassel pickers stand, are carried at the lower ends of upright pipe members 93 which are secured to ring clamps 94 adapted to fit about the front platform support 91. Curved railings 96 are provided at the top ends of the pipe members 93 against which the tassel pickers may rest. By virtue of the clamp rings 94, the platforms 92 are adjustably movable in an up and down direction, and pivotally about the front platform support 91.

A pair of rear standing platforms 97, for the rear legs 19, are mounted on forwardly projected extensions 98 formed at the lower ends of upright pipe members 99, equipped with clamp rings 101 adapted to fit about the rear legs. Rest railings 100 are provided at the top ends of the upright members 99.

As thus far described, the machine of this invention is adapted for the detasseling of four rows of corn. Thus, as shown in Fig. 8, the front wheel assembly and rear legs 19, are spaced transversely of the machine so as to travel between adjacent rows of corn, indicated at 102, 103, 104 and 105, with the front wheel assembly being between the rows 103 and 104 and the rear legs 19 between the rows 102 and 103, and the rows 104 and 105. The tassel pickers on the front platforms 92 are thus in positions to work on the rows 103 and 104, while the detasselers on the rear platforms 97 work on the rows 102 and 105. By virtue of the arrangement of the operator's seat 46 on the rear cross member 12, the operator is in a position to both steer the machine and to oversee the work of the detasselers who are positioned below him, so as to adjust the machine speed to detasseling conditions.

When six rows of corn are to be detasseled, the cross member 12 is provided with extension units of a tubular construction, indicated generally as 106 (Figs. 5 and 6), and of a substantially inverted U-shape having one leg 107 shorter than the other leg 108. The length of the base or connecting member 109 between the legs 107 and 108, corresponds to the transverse distance between the steering post 16 and the rear legs 19.

In assembly, the short leg 107 is received in bearing engagement within the open top end 111 of the rear legs 19 to provide for a pivotal movement of an extension unit 106 within a rear leg. The units 106 are maintained against pivotal movement at positions in substantially the plane of the connecting member 12 by the provision of lugs 112 on the legs 107, which are receivable within corresponding notches 113 formed in the top ends 111 of the rear legs 19.

The legs 108 are equipped with standing platforms 97 and upright members 99 having clamp rings 101 which are of a construction and assembled with the legs 108 in all respects similar to the like parts associated with the rear legs 19. A further description of the standing platforms for the legs 108 is thus believed to be unnecessary.

When the extension units 106 are used, the detasselers carried thereby are adapted to work on the corn rows 124 and 126 (Fig. 8), which are arranged adjacent to and to the outside of the corn rows 102 and 105, it being understood that the rows 102–105, inclusive, are detasseled in all respects in the manner previously described.

For the detasseling of eight rows of corn, the extension units 106 are provided with detachable platform supports, designated generally as 114 (Figs. 5, 6 and 8) of an inverted L-shape tubular construction. The short leg 116 of an L-support 114 has its free end 117 adapted to be received within the open outer end 118 of the base member 109 of a corresponding extension unit 106.

Extended transversely through the base member ends 118 are bolts or rod members 119 which are receivable within a pair of oppositely arranged inclined slots 121 formed in the ends 117 of the L-member legs 116 so as to constitute a bayonet and slot connection. The slots 121 and bolts 119 are relatively arranged so that in their connected positions the long legs 122 of the L-members 114 are projected downwardly from the corresponding legs 108 of the extension units 106, at a distance which is substantially equal to the distance between a rear leg 19 and a next adjacent extension leg 108.

Standing platforms 97, having upright members 99 equipped with clamp rings 101, are assembled with the L-member legs 122 in all respects similar to the assembly of like parts with the extension legs 108. In the detasseling of eight rows of corn, the L-member attachments 114 are assembled with the extensions 106 to provide for the detasseling of the corn rows 127 and 128, as shown in Fig. 8.

When the machine is to travel along a highway, or through a farm gate, it is only necessary to elevate the extensions 106 to disengage the lugs 112 from the slots 113 so that the lugs 112 ride on the top edges of the upper ends 111 of the legs 19. The extensions 106 and attachments 114 are then pivotally swung forwardly as a unit, toward the backbone 11, whereby to appreciably decrease the overall transverse dimension of the machine.

To facilitate the handling of the machine for shipping purposes, the connecting member 12 (Figs. 5 and 8) has flanged connections 131 with the rear legs 19, and a flanged connection 132 with the backbone member 11. Also, the backbone member 11 is in a flanged connection 133 with the steering post assembly. It is seen, therefore, that the attachments 114, extensions 106, rear legs 19, connecting member 12, backbone member 11, and component parts of the steering post assembly including the power unit 68, can be conveniently handled as individual packages.

From a consideration of the above description, it is seen that the invention provides a corn detasseling machine of a compact and rugged construction, having a high degree of maneuverability, capable of operating under substantially all weather conditions, and readily applicable to the detasseling of either four, six or eight rows of corn. The machine is completely operable from the operator's seat 46, and the operator is at a position to not only steer the machine but to conveniently oversee the work of the tassel pickers carried on the standing platforms.

When grown corn is to be fertilized, fertilizer containers (not shown) may be mounted from the front platform support 91, and the legs 19, 108 and 122 to provide for the spreading of fertilizer between the corn rows. For spraying purposes a compressor (not shown) is mountable on the engine base 69 forwardly of the unit 68, and a pressure tank (not shown) is carried on the backbone 11 rearwardly of the steering post 16. Sprays (not shown) connectible with the pressure tank, may be carried in a spaced relation on the rear transverse member 12, connecting members 109 and leg members 116.

Although the invention has been illustrated in connection with a preferred embodiment thereof, it is to be understood that it is not to be so limited since changes and modifications can be made therein which are within the full intended scope of this invention as defined by the appended claims.

We claim:

1. A corn detasseling machine comprising a frame structure having a longitudinally extended frame member, a downwardly projected steering post rotatably supported at the front end of said frame member, a combination tractor and steering wheel at the lower end of said steering post, a power unit on said steering post operatively connected with said front wheel, a transverse frame member secured intermediate the ends thereof to the rear end of said longitudinal frame member, a pair of upright frame members extended downwardly from the opposite ends of said transverse member, rear ground wheels carried at the lower ends of said upright members, a second pair of upright members spaced from said first pair of upright members, means supporting said second pair of upright members on said first pair of upright members for movement to positions in the plane of said transverse member, and to positions substantially within the longitudinal confines of said transverse member, standing platforms mounted on said upright members, and other standing platforms mounted on said longitudinal frame member.

2. A corn detasseling machine comprising a longitudinally extended frame member, a transverse member secured intermediate the rear ends thereof to the rear end of said frame member, a pair of upright supports connected adjacent their upper ends to the outer ends of said transverse member, ground wheels rotatably carried at the lower ends of said upright supports, extension units pivotally supported at the ends of said transverse member for adjustable movement in a horizontal plane, downwardly projected supports at the free ends of said extensions, standing platforms carried on all of said supports at positions adjacent the lower ends thereof, a downwardly extended steering post rotatably supported at the front end of said longitudinal member, a steering wheel rotatably supported at the lower end of said steering post, and a power unit on said steering post operatively connected in a driving relation with said steering wheel.

3. A corn detasseling machine comprising a main frame of a T-shape having the stem thereof extended longitudinally of the machine and the cross arm thereof arranged transversely of the machine at the rear end of said stem, a downwardly extended steering post rotatably supported at the front end of the stem of said T-frame, a front wheel on said steering post, a power unit on said steering post for driving said front wheel, a pair of downwardly projected legs at the opposite ends of said cross member, rear wheels adjacent the lower ends of said pair of legs, longitudinal extensions for said cross member, means pivotally supporting said extensions on said cross member for adjustable movement in a horizontal plane, supports suspended from the outer ends of said extensions, standing platforms mounted on said legs, supports and stem member, with said steering post, legs and supports being relatively arranged so as to travel between the rows of corn.

4. A corn detasseling machine comprised of a portable frame of a substantially T-shape having the stem thereof arranged longitudinally of the machine and the cross arm thereof arranged transversely of the machine at the rear end of said stem, an upright steering post rotatably supported at the front end of said stem, a combination traction and steering front wheel at the lower end of said steering post, a power unit on said steering post located above said front wheel and operatively connected therewith, a pair of downwardly projected supports at the opposite ends of said cross member, a pair of rear wheels carried adjacent the lower ends of said supports, first standing platforms adjustably carried on said supports for up and down movement and for pivotal movement about said supports, and second standing platforms adjustably supported from the front end of said stem at a position rearwardly of said steering post.

5. A corn detasseling machine comprised of a portable frame having a longitudinal frame member and a transverse member secured to the rear end of said longitudinal member, an upright steering post rotatably supported at the front end of said longitudinal member, a combination traction and steering front wheel at the lower end of said steering post, a power unit on said steering post located above said front wheel and operatively connected therewith, a pair of downwardly projected tubular supports at the opposite ends of said transverse member, rear ground wheels adjacent the lower ends of said supports, longitudinal extensions for said transverse member, pivots at the inner ends of said extensions receivable in bearing engagement within the upper ends of said tubular supports, means for holding said extensions against pivotal movement at positions in substantial longitudinal alignment with said transverse member, downwardly projected leg members at the outer ends of said extensions, first standing platforms carried on said tubular supports and leg members, and second standing platforms supported from said longitudinal member adjacent the forward end thereof.

RAYMOND W. HAGIE.
EDGAR V. COLLINS.

REFERENCES CITED

The following references are of record in the file of this patent:

UNITED STATES PATENTS

| Number | Name | Date |
|---|---|---|
| 152,244 | Murch | June 23, 1874 |
| 889,958 | O'Shaughnessy | June 9, 1908 |
| 1,052,829 | Karminski et al. | Feb. 11, 1913 |
| 1,362,944 | Kirby | Dec. 21, 1920 |
| 2,095,007 | Pfister | Oct. 5, 1937 |
| 2,184,198 | Seeber | Dec. 19, 1939 |
| 2,378,143 | Jensen | June 12, 1945 |
| 2,427,746 | Sawtell | Sept. 23, 1947 |

FOREIGN PATENTS

| Number | Country | Date |
|---|---|---|
| 621,246 | Germany | Nov. 4, 1935 |